(12) United States Patent
Scholz

(10) Patent No.: US 9,340,102 B2
(45) Date of Patent: May 17, 2016

(54) HYBRID DRIVE CONFIGURATION FOR A MOTOR VEHICLE

(71) Applicant: VOLKSWAGEN AKTIENGESELLSCHAFT, Wolfsburg (DE)

(72) Inventor: Norbert Scholz, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/732,641

(22) Filed: Jun. 5, 2015

(65) Prior Publication Data

US 2015/0273999 A1      Oct. 1, 2015

Related U.S. Application Data

(63) Continuation of application No. PCT/EP2013/073183, filed on Nov. 6, 2013.

(30) Foreign Application Priority Data

Dec. 10, 2012   (DE) .......................... 10 2012 024 174

(51) Int. Cl.
*F16H 3/72*      (2006.01)
*F16H 37/06*     (2006.01)
(Continued)

(52) U.S. Cl.
CPC . *B60K 6/54* (2013.01); *B60K 6/365* (2013.01); *B60K 6/44* (2013.01); *B60K 6/445* (2013.01);
(Continued)

(58) Field of Classification Search
CPC .................. F16H 2200/0021; F16H 2200/202; F16H 2200/2023; F16H 2200/2025; F16H 2200/2028
See application file for complete search history.

(56) References Cited

U.S. PATENT DOCUMENTS

2007/0042852 A1*   2/2007   Bucknor ................. B60K 6/40
                                                              475/5
2007/0225097 A1*   9/2007   Raghavan ............... B60K 6/40
                                                              475/5
(Continued)

FOREIGN PATENT DOCUMENTS

DE     10 2006 044 895 A1    4/2008
DE     10 2010 042 005 A1    5/2011
(Continued)

OTHER PUBLICATIONS

Search Report issued by the German Patent and Trademark Office for German Patent Application No. DE 10 2012 024 174.7, dated Aug. 22, 2013.
(Continued)

*Primary Examiner* — Tisha Lewis
(74) *Attorney, Agent, or Firm* — Manfred Beck, P.A.

(57) ABSTRACT

A hybrid drive configuration for a motor vehicle includes a first planetary set whose internal gear is coupled via a first brake to a transmission housing. A second planetary set is embodied as a Ravigneaux set. The first sun of the Ravigneaux gear set, which meshes with the long planets thereof, is connected to the rotor of a first electrical machine and is coupled via a first clutch to the internal gear of the first planetary set. The second sun of the Ravigneaux set, which meshes with the short planets thereof, is coupled via a second brake to the transmission housing. The carrier of the Ravigneaux set is coupled via a second clutch to the carrier of the first planetary set and the ring gear of the Ravigneaux set is connected to the input shaft.

7 Claims, 5 Drawing Sheets

(51) Int. Cl.
  *B60K 6/54* (2007.10)
  *B60K 6/365* (2007.10)
  *B60K 6/44* (2007.10)
  *B60K 6/445* (2007.10)
  *F16H 3/66* (2006.01)
  *F16H 37/10* (2006.01)

(52) U.S. Cl.
  CPC ............... *F16H 3/663* (2013.01); *F16H 3/728* (2013.01); *F16H 2037/104* (2013.01); *F16H 2037/108* (2013.01); *F16H 2200/2005* (2013.01); *F16H 2200/2007* (2013.01); *F16H 2200/2023* (2013.01); *Y02T 10/623* (2013.01); *Y02T 10/6239* (2013.01); *Y10S 903/911* (2013.01)

(56) References Cited

U.S. PATENT DOCUMENTS

2007/0275806 A1   11/2007   Raghavan et al.
2009/0275437 A1   11/2009   Kersting
2011/0111908 A1*   5/2011   Kim .................... B60K 6/365
                                                              475/5
2013/0165286 A1    6/2013   Scholz

FOREIGN PATENT DOCUMENTS

DE    10 2010 035 205 A1    3/2012
DE    10 2010 035 206 A1    3/2012

OTHER PUBLICATIONS

International Search Report for International Application No. PCT/EP2013/073183 and translation thereof, dated Jan. 30, 2014.

International Preliminary Report on Patentability for International Application No. PCT/EP2013/073183 including Written Opinion of the International Searching Authority and translation thereof, dated Jun. 16, 2015.

* cited by examiner

HYBRID DRIVE CONFIGURATION FOR A MOTOR VEHICLE

CROSS-REFERENCE TO RELATED APPLICATIONS

This application is a continuation, under 35 U.S.C. §120, of copending International Application No. PCT/EP2013/073183, filed Nov. 6, 2013, which designated the United States; this application also claims the priority, under 35 U.S.C. §119, of German Patent Application No. DE 10 2012 024 174.7, filed Dec. 10, 2012; the prior applications are herewith incorporated by reference in their entirety.

BACKGROUND OF THE INVENTION

Field of the Invention

The invention relates to a hybrid drive configuration for motor vehicles.

Multiple embodiments of hybrid drive configurations in the form of power-split transmissions are known to a person skilled in the art. German Patent Application DE 10 2006 044 895 A1 discloses a hybrid drive configuration having a first and a second electric machine which are configured with internal-rotor type of construction and in each case have an inner rotor and an outer stator which is fixed with respect to the housing, and can be operated both in motor and in generator mode. The two electric machines are connected to one another via power electronics. Via the power electronics, furthermore, the electric machines can be connected to an electric energy store. An input shaft of the transmission can be connected to an internal combustion engine. An output shaft of the transmission can be connected to an output train which can include, in particular, a differential and the drive wheels. Furthermore, the known configuration includes two planetary sets. The first planetary set includes, as customary, a central sun, an outer internal gear and a carrier, on which at least one set of planets which mesh firstly with the sun and secondly with the internal gear are arranged rotatably. In the context of the present application, the expressions sun and sun gear and planet and planetary gear are used synonymously, in each case the corresponding functional element with the actual gear which is usually configured as a spur gear and the associated shaft being meant. The second planetary set is configured as a Ravigneaux set, on the carrier of which two sets of planets are arranged, one set of long planets which extend further axially meshing firstly with a first sun and secondly with the internal gear and an axially shorter set of short planets meshing firstly with a second sun and secondly with the long planets. The sun of the first planetary set is connected to the rotor of the second electric machine, its carrier is connected to the input shaft and its internal gear is coupled via a first brake to the transmission housing. The first sun of the Ravigneaux set is coupled via a first clutch to the internal gear of the first planetary set, its carrier is coupled firstly via a first clutch to the input shaft and secondly via a first brake to the transmission housing, and its internal gear is connected to the output shaft. The second sun of the Ravigneaux set is coupled via a second brake to the transmission housing.

The term "connected" is used here in the sense of a fixed connection. In contrast to this, the term "coupled" includes both fixed connections and also switchable or variable connections within the context of the present description. If the latter case is meant in specific terms, the corresponding switching element, in particular a brake or a clutch, is explicitly specified as a rule. If, in contrast, the first case is meant specifically, the use of the term "coupled" is as a rule dispensed with in favor of the more specific term "connected". The use of the term "coupled" without the specification of a specific switching element therefore indicates the specifically intended inclusion of both cases. This distinction is made solely for the sake of improved comprehension and, in particular, to illustrate where the provision of a switchable or variable connection is absolutely necessary instead of a fixed connection which can be realized more easily as a rule. The above definition of the term "connected" is therefore in no way to be interpreted so narrowly that clutches which are arbitrarily introduced for circumvention purposes would fall outside its literal sense.

The known apparatus provides seven operating modes, namely three infinitely variable, power-split driving ranges, two fixed gears (1× overdrive and 1× underdrive), a purely electric driving range and a serial mode. It is not possible to configure all modes to be equally efficient. The transmission design therefore takes place in such a way that the mode which is mainly used is designed to be particularly efficient. However, the degrees of utilization of the different modes are shifting as a result of increasing progress in the electrification of hybrid drives.

SUMMARY OF THE INVENTION

It is accordingly an object of the invention to provide a hybrid drive configuration for a motor vehicle which overcomes disadvantages of the heretofore-known hybrid drive configurations of this general type. It is in particular an object of the invention to provide a novel structure for a hybrid drive apparatus with a degree of efficiency which is improved overall.

With the foregoing and other objects in view there is provided, in accordance with the invention, a hybrid drive configuration for a motor vehicle, including:
  a transmission housing;
  a first and a second electric machine each having a rotor and each having a stator connected fixedly to the transmission housing, the first and the second electric machine each being operable both in a motor mode and in a generator mode and, via power electronics, being connectable to one another and to an electric energy store;
  an input shaft, which is connectable to an internal combustion engine, and an output shaft, which is connectable to an output train;
  a first brake and a second brake;
  a first clutch and a second clutch;
  a first planetary set having a sun, a carrier, and an internal gear, the sun of the first planetary set being connected to the rotor of the second electric machine, the carrier of the first planetary set being connected to the output shaft, and the internal gear of the first planetary set being coupled via the first brake to the transmission housing;
  a second planetary set configured as a Ravigneaux set and having a carrier, a first sun, a second sun, long planets, and short planets;
  the first sun of the second planetary set meshing with the long planets and being firstly connected to the rotor of the first electric machine and secondly coupled via the first clutch to the internal gear of the first planetary set;
  the second sun of the second planetary set meshing with the short planets and being coupled via the second brake to the transmission housing;
  the carrier of the second planetary set being coupled via the second clutch to the carrier of the first planetary set; and the internal gear of the second planetary set being connected to the input shaft.

In other words, the object of the invention is achieved by a hybrid drive configuration for a motor vehicle, including:

a first and a second electric machine which in each case have a rotor and a stator which is connected fixedly to a transmission housing, and can be operated both in motor and in generator mode and can be connected to one another via power electronics and can be connected to an electric energy store, an input shaft which can be connected to an internal combustion engine and an output shaft which can be connected to an output train, a first planetary set, the sun of which is connected to the rotor of the second electric machine, the carrier of which is connected to the output shaft, and the internal gear of which is coupled via a first brake to a transmission housing, and a second planetary set which is configured as a Ravigneaux set, the first sun of which, which meshes with the long planets of the Ravigneaux set, is firstly connected to the rotor of the first electric machine and is secondly coupled via a first clutch to the internal gear of the first planetary set, the second sun of which, which meshes with the short planets of the Ravigneaux set, is coupled via a second brake to the transmission housing, the carrier of which is coupled via a second clutch to the carrier of the first planetary set, and the internal gear of which is connected to the input shaft.

In this transmission structure, a total of seven modes, namely four infinitely variable driving ranges, two fixed gears and a purely electric driving range, are available for driving operation.

A first infinitely variable, power-split driving range results when the first brake is closed and the second clutch is closed, the first clutch and the second brake being open. On account of the closed first brake, the first planetary set acts as a pure transmission ratio stage for coupling the second electric machine to the output shaft. On account of the open second brake, the short planet part of the Ravigneaux set is switched such that it is without effect. The Ravigneaux set therefore acts like a simple planetary set, the carrier of which is connected to the output shaft on account of the closed second clutch, and which serves as a branching point for the power flow from or, respectively, to the internal combustion engine and the first electric machine.

When the first brake is closed, the first and second clutches are closed, and the second brake is open, the result is a fixed gear, which corresponds to a third gear in accordance with typical transmission ratios, in a parallel hybrid operating type. Here, the torque of the second electric machine and of the internal combustion engine acts on the output shaft, whereas the rotor of the first electric machine is at a standstill. In contrast to the abovementioned, first power-split mode, the Ravigneaux set acts as a pure transmission ratio stage for the torque of the internal combustion engine on account of the closed first clutch which fixes both its sun and the rotor of the first electric machine (via the first brake) to the transmission housing.

In a second power-split, infinitely variable driving range, the first clutch and the second clutch are closed, whereas the first brake and the second brake are open. In this constellation, the internal gear of the first planetary set, instead of being fixed to the housing, is short-circuited on account of the closed first clutch with the first sun of the Ravigneaux set and the rotor of the first electric machine. In addition to the Ravigneaux set, the first planetary set therefore also acts as a power-split point. In contrast to the solution which is known from the prior art, the power output of the internal combustion engine is not guided here via a second planetary set in the form of a double planetary set with a high number of toothing engagement locations, but rather via a second planetary set which is configured as a Ravigneaux planetary set with a smaller number of toothing engagement locations, which means there is an advantage in terms of the degree of efficiency in the second power-split driving range.

A further fixed gear which would correspond to a sixth gear in customary gear transmission ratios results in the parallel hybrid mode when the second brake is closed, the first and second clutches are closed, and the first brake is open. Here, on account of the fixed second sun, the Ravigneaux set acts as a simple transmission ratio stage for the torque of the internal combustion engine. The first planetary set acts as a simple transmission ratio stage for the torque of the second electric machine, the transmission ratio which is realized by way of the mechanical short-circuit between the first sun of the Ravigneaux set and the internal gear of the first planetary set being defined via the first clutch.

A third power-split, infinitely variable driving range is realized when the second brake is closed, the first clutch is closed, and the first brake and second clutch are open. The Ravigneaux set is decoupled from the output shaft on account of the open second clutch. On account of its second sun which is fixed by the second brake, it acts as a pure transmission ratio stage for a torque from the internal combustion engine to the first electric machine and, on account of the closed first clutch, to the internal gear of the first planetary set. The latter represents the power-split point for the power output of the second electric machine and the sum of the power output of the first electric machine and the internal combustion engine.

A fourth infinitely variable driving range in a serial hybrid operating type is realized if the first and second brakes are closed, and the first and second brakes are open, and the first and second clutches are open. Here, on account of the open clutches, the Ravigneaux set is decoupled both from the output shaft and from the first planetary set. On account of its second sun which is fixed via the second brake, it acts as a transmission ratio stage for the generator mode of the first electric machine. The electrical energy which is generated here is fed to the second electric machine which is operated as a motor and the torque of which is guided to the output shaft via the first planetary set which acts as a pure transmission ratio stage on account of its internal gear which is fixed through the use of the first brake.

Purely electric operation is realized finally when the first and second brakes are closed, the first clutch is closed and the second clutch is open. The internal combustion engine and the first electric machine are at a standstill in this mode, as is the internal gear of the first planetary set. The output shaft is therefore fed solely a torque which is generated by the second electric machine and transmitted via the first planetary set which acts as a pure transmission ratio stage.

In accordance with an advantageous development of the invention, it is provided that the carrier of the second planetary set is coupled to its internal gear via a third clutch. As a result, an additional fixed gear in the case of internal combustion engine mode and a further infinitely variable driving range in a serial hybrid operating type with a reduced rotational speed of the first electric machine can be achieved. In principle, every coupling of two central shafts of one of the planetary sets would be suitable for this purpose. However, the stated position of the third clutch results in the lowest drag losses on account of the particularly low relative rotational speeds which prevail here.

The new fixed gear in a parallel hybrid operating type which would correspond to a fourth gear in the case of customary gear transmission ratios is realized when the first, second and third clutches are closed, and the first and second brakes are open.

The additional infinitely variable driving range in a serial hybrid operating type is realized when the first brake is closed, the third clutch is closed, the second brake is open, and the first and second clutches are open.

All other operating modes can be realized as described above, in each case with an open third clutch.

According to another, alternative or additional development of the invention, a further clutch, also denoted as a fourth clutch, is provided, via which the input shaft is coupled to the rotor of the second electric machine. In other words, in an alternative or additional development of the invention, the input shaft is coupled via a fourth clutch to the rotor of the second electric machine. A hill-climbing gear with a high gear transmission ratio can be realized as a result.

The additional gear which would correspond to a second gear in conventional gear transmission ratios is realized when the first brake is closed, the first, second and fourth clutches are closed, the second brake is open, and the third clutch is open. All remaining modes can be realized in the above-described way, in each case with an open fourth clutch.

For all three abovementioned embodiments of the invention, a shaft configuration is possible which provides that the output shaft is configured as a hollow shaft which extends coaxially around the input shaft. This is required for transverse installation configurations of the configuration according to the invention. In the two embodiments mentioned first, it is additionally possible that connection points of the input shaft and the output shaft lie at the edge on a common axial side of the hybrid drive configuration.

The two embodiments of the invention mentioned first, but not the embodiment which is mentioned third above, are additionally suitable for longitudinal installation. To this end, it can be provided that the input shaft and the output shaft are arranged axially adjacently with respect to one another, and connection points of both shafts lie at the edge on opposite axial sides of the hybrid drive configuration.

According to another feature of the invention, respective connection points of the input and the output shaft are situated at the edge on a common axial side of the hybrid drive configuration.

Further features and advantages of the invention result from the following, specific description and the drawings. Further features which are considered as characteristic for the invention are set forth in the appended claims.

Although the invention is illustrated and described herein as embodied in a hybrid drive configuration for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
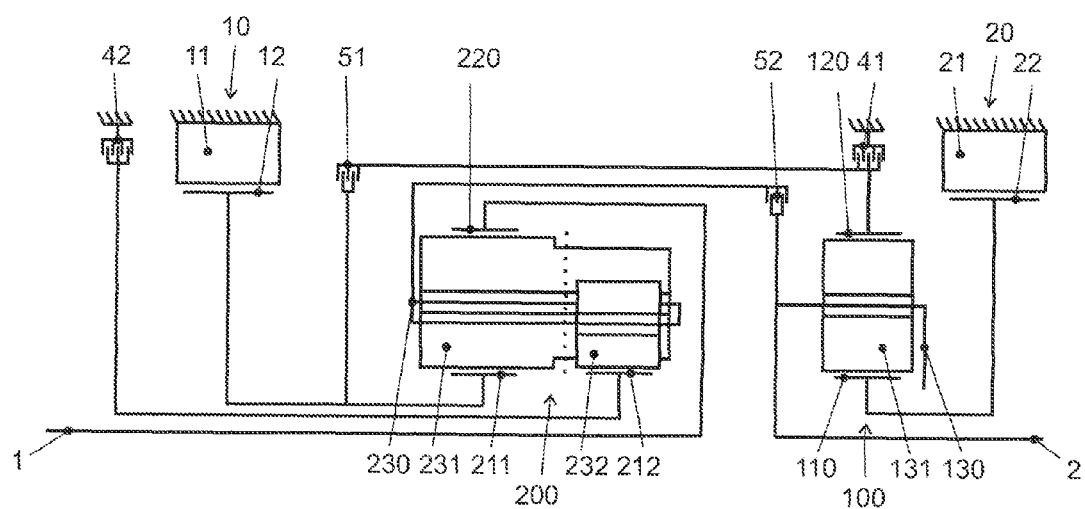
FIG. 1 is a schematic view illustrating an embodiment of the invention in a constellation for longitudinal installation.

In the figures, the same reference numerals indicate the same or analogous components. Referring now to the figures of the drawings in detail and first, particularly, to FIG. 1 thereof, there is shown an embodiment of the hybrid drive configuration according to the invention in an embodiment which is suitable for longitudinal installation in a motor vehicle. The input shaft 1 can be connected directly or indirectly to an internal combustion engine which is not shown in greater detail in the figures. The output shaft 2 can be connected indirectly or directly to an output train which is not shown in greater detail in the figures.

The configuration according to the invention has two electric machines, namely the first electric machine 10 and the second electric machine 20, which can both be operated both in motor mode and in generator mode. Each of the electric machines 10, 20 has a stator 11, 21 which is fixed to the housing and a rotatable rotor 12, 22. The electric machines 10, 20 are of an internal rotor configuration in the embodiment which is shown.

The configuration according to the invention includes, furthermore, a first planetary set 100 which has, in a usual way, a sun 110, an internal gear 120 and a carrier 130, on which a set of planetary gears 131 are mounted rotatably and mesh both with the sun 110 and with the internal gear 120.

The configuration according to the invention includes, furthermore, a second planetary set 200 which is configured as a Ravigneaux set and, in the usual way, has two suns 211, 212, an internal gear 220 and a carrier 230, on which a set of long planets 231 and a set of short planets 232 are mounted rotatably. In a first axial section, the long planets 231 mesh both with the first sun 211 and with the internal gear 220. In their second axial section, the long planets 231 mesh with the short planets 232. The latter for their part mesh with the second sun 212.

In order to connect the abovementioned elements, it is provided in the embodiment of the invention which is shown that the sun 110 of the first planetary set is connected to the rotor 22 of the second electric machine. The internal gear 120 of the planetary set 100 is coupled via a first brake 41 to the transmission housing, that is to say can be fixed to the latter. Moreover, the internal gear 120 of the first planetary set 100 is coupled via a first clutch 51 to the first sun 211 of the Ravigneaux set 200 and to the rotor 12 of the first electric machine. The carrier 130 of the first planetary set 100 is connected firstly to the output shaft 2. Secondly, it is coupled via a second clutch 52 to the carrier 230 of the Ravigneaux set 200. The first sun 211 of the Ravigneaux set 200 is connected to the rotor 12 of the first electric machine. Moreover, it is coupled via the abovementioned first clutch 51 to the internal gear 120 of the first planetary set. The second sun 212 of the Ravigneaux set 200 is coupled via a second brake 42 to the housing, that is to say can be fixed to the latter. The internal gear 220 of the Ravigneaux set 200 is connected to the input shaft 1. The carrier 230 of the Ravigneaux set 200 is coupled via the abovementioned second clutch 52 to the carrier 130 of the first planetary set and via the latter to the output shaft 2. This connection is identical in all embodiments which are shown, and is therefore not to be repeated in each case in the following text.

Figure 2:
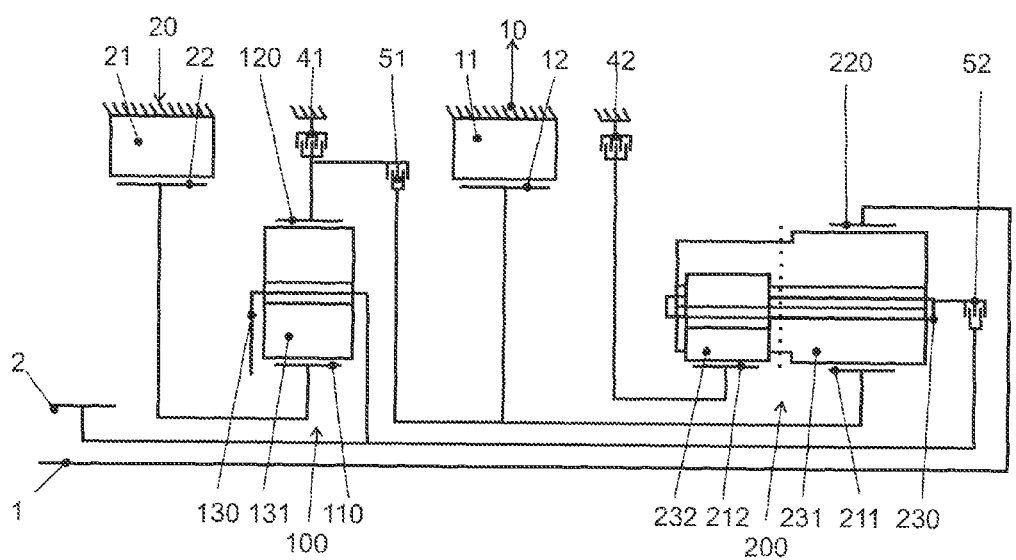
FIG. 2 is a schematic view illustrating an embodiment of the invention in a constellation for transverse installation.
Figure 3:
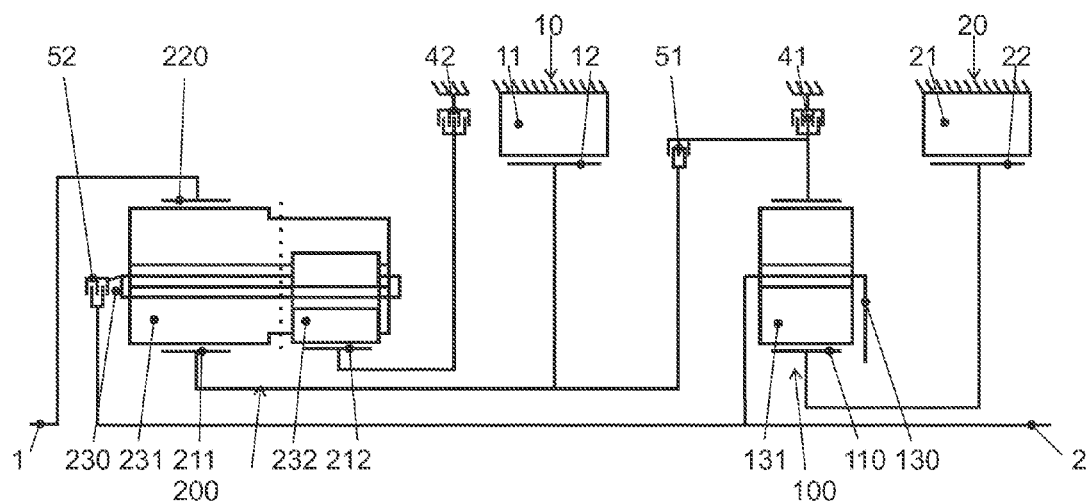
FIG. 3 is a schematic view illustrating a further embodiment of the invention in a constellation for longitudinal installation.
Figure 4:
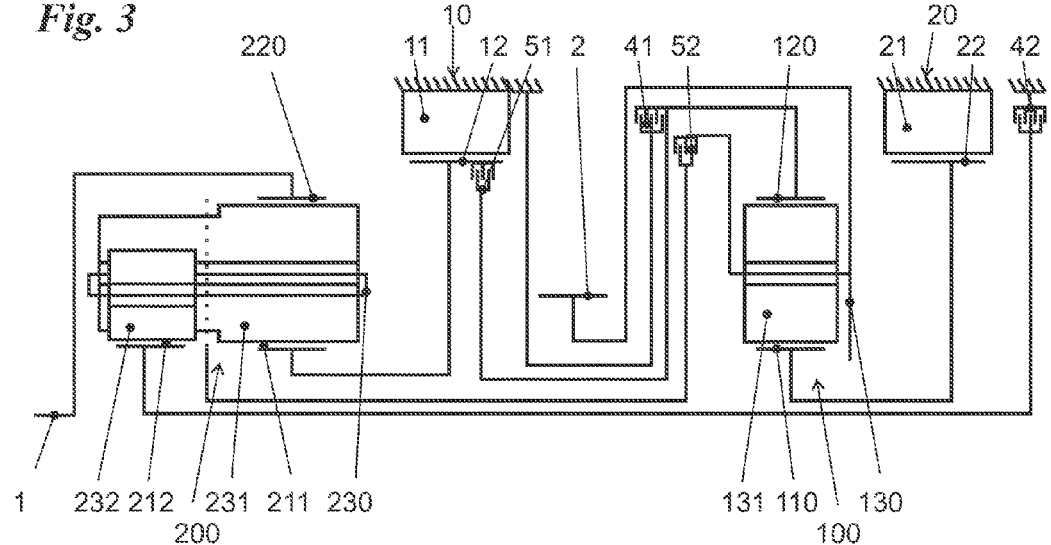
FIG. 4 is a schematic view illustrating a further embodiment of the invention in a constellation for transverse installation.
Figure 5:
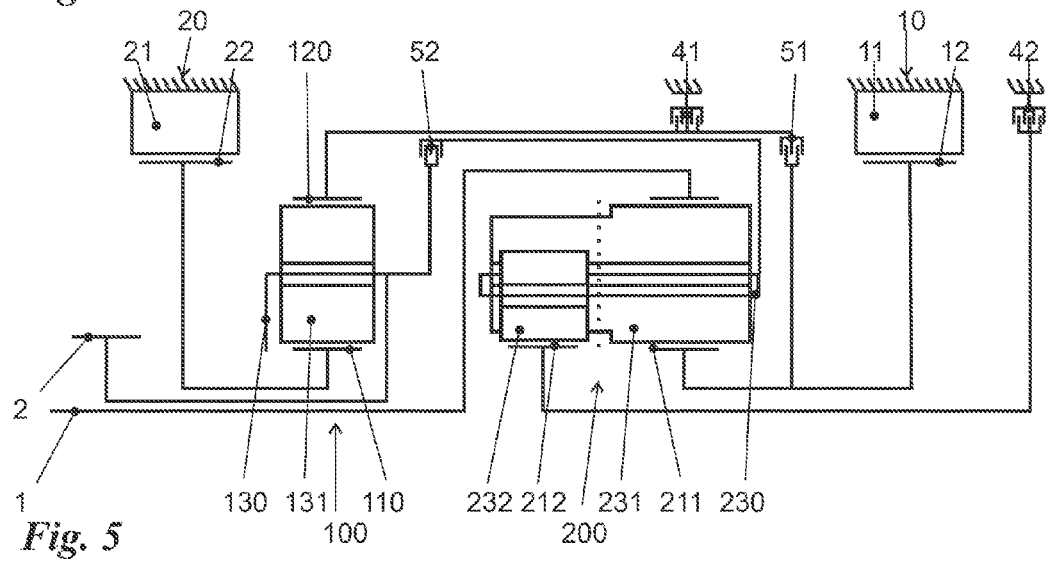
FIG. 5 is a schematic view illustrating a further embodiment of the invention in a constellation for transverse installation.

FIG. 2 shows the same hybrid drive configuration, but in a constellation which is suitable for transverse installation in a motor vehicle. This constellation is considered to be particularly advantageous, since the staggered arrangement of the individual elements with different radii permits a conical shape of the transmission housing, which conical shape is particularly favorable in terms of installation space. FIGS. 3 to 7 represent alternative constellations for the axial arrangement of the elements, but always have the same, above-described connection here. Reference is made to the above, general part of the description with regard to the operating modes which can be achieved by way of these configurations.

Figure 6:
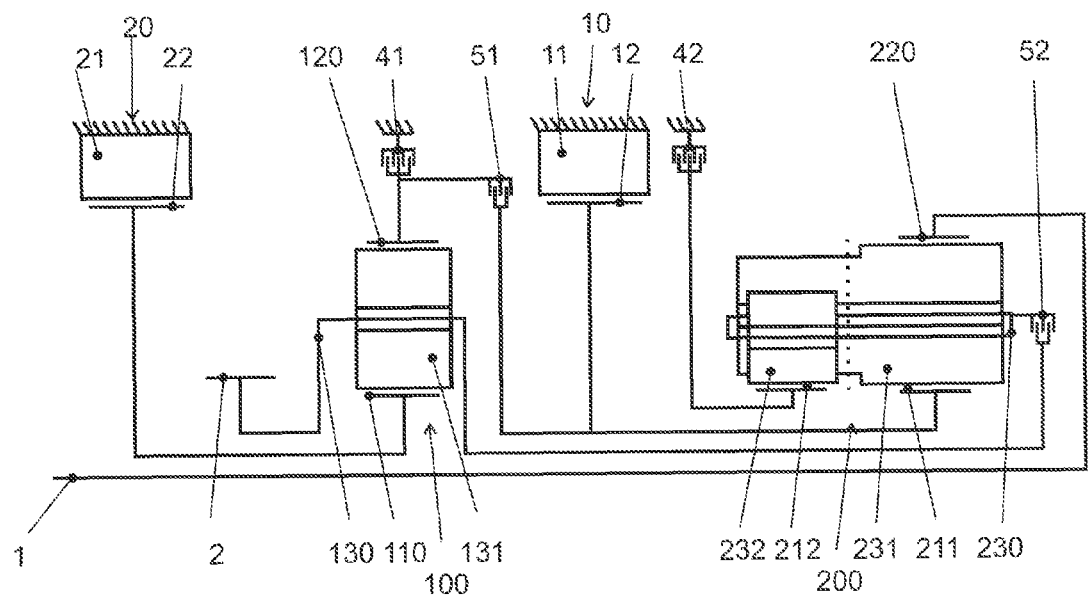
FIG. 6 is a schematic view illustrating a further embodiment of the invention in a constellation for transverse installation.
Figure 7:
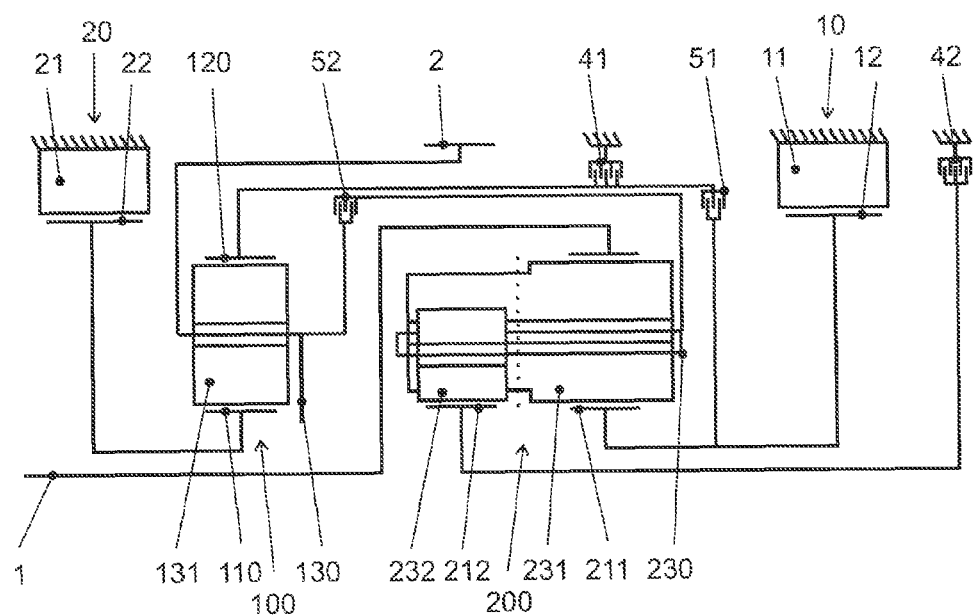
FIG. 7 is a schematic view illustrating a further embodiment of the invention in a constellation for transverse installation.
Figure 8:
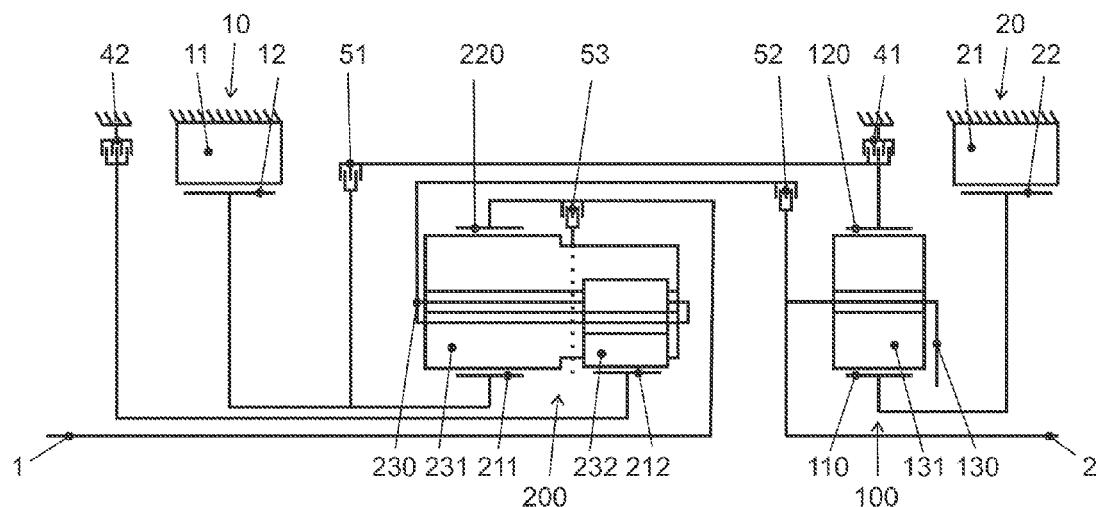
FIG. 8 is a schematic view illustrating an embodiment according to FIG. 1 which is modified by way of a first enhancement in accordance with the invention.
Figure 9:
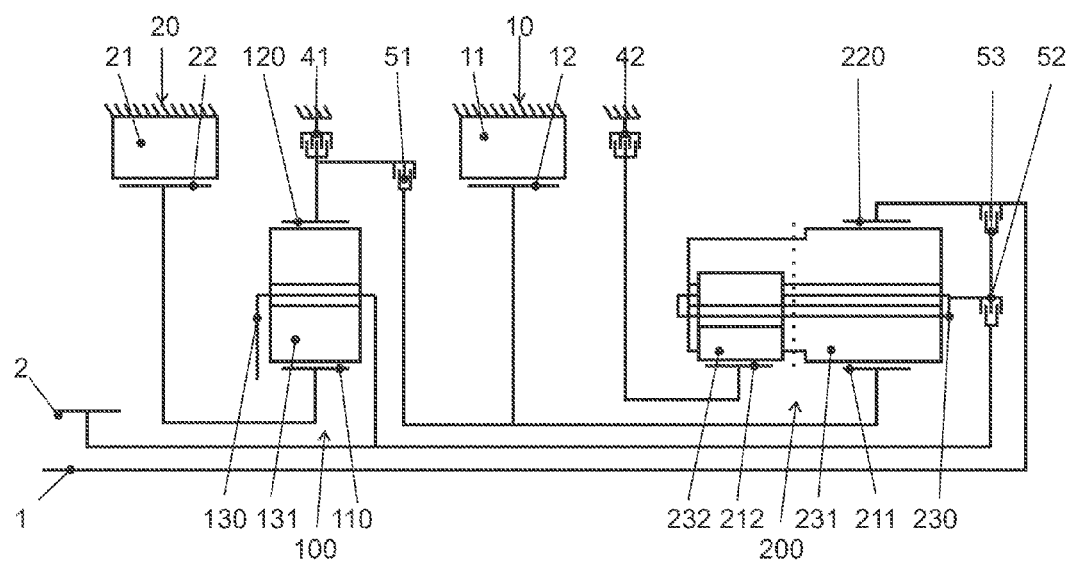
FIG. 9 is a schematic view illustrating an embodiment according to FIG. 2 which is modified by way of the first enhancement in accordance with the invention.

FIGS. 8 and 9 show by way of example a first enhancement of the configurations of FIGS. 1 and 2, which enhancement, however, can also readily be applied to the constellations of FIGS. 3 to 7 or alternative constellations thereto, as a person skilled in the art will recognize without difficulty. The enhancement consists of an additional third clutch 53 which couples the carrier 230 of the Ravigneaux set 20 to its internal gear 220. If two main shafts of a planetary set are short-circuited with one another, that is to say fixed to one another, the entire unit circulates as a block, with the result that no losses are produced as a result of internal tooth engagements. Reference is made to the above, general part of the description with regard to the additional operating modes which result herefrom.

Figure 10:
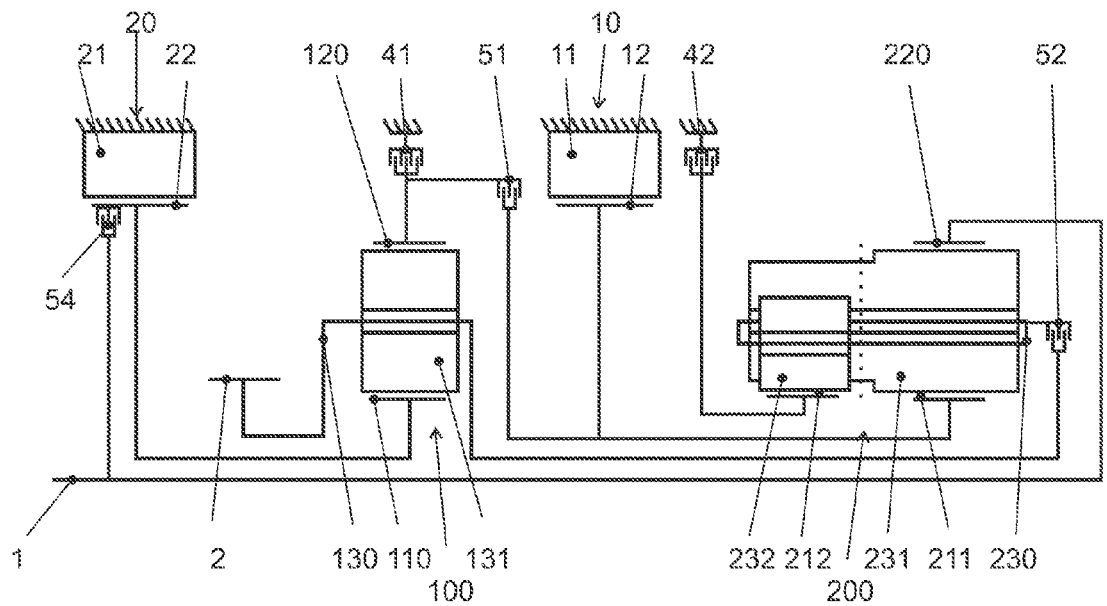
FIG. 10 is a schematic view illustrating an embodiment according to FIG. 6 which is modified by way of a second enhancement in accordance with the invention.
Figure 11:
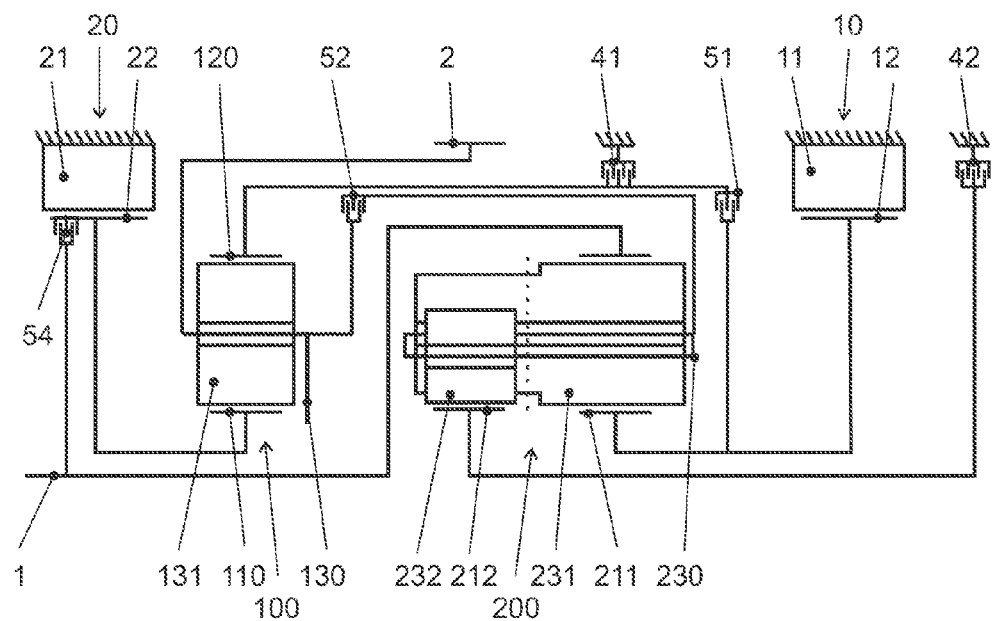
FIG. 11 is a schematic view illustrating an embodiment according to FIG. 7 which is modified by way of the second enhancement in accordance with the invention.

FIGS. 10 and 11 use the example of the constellations of FIGS. 6 and 7 to show a second enhancement of the invention which can be used as an alternative or in addition to the above-described first enhancement, but can be applied only in the case of constellations, in which the second electric machine 20 is arranged axially on the edge. The second enhancement consists of the additional, fourth clutch 54 which couples the rotor 22 of the second electric machine to the input shaft 1. Reference is made to the above, general part of the description with regard to the additional operating modes which result herefrom.

The embodiments which are discussed in the specific description and are shown in the figures of course represent only illustrative exemplary embodiments of the present invention. A broad spectrum of possible variations are available to a person skilled in the art in the light of the disclosure here.

LIST OF REFERENCE CHARACTERS

1 Input shaft
2 Output shaft
10 First electric machine
11 Stator of 10
12 Rotor of 10
20 Second electric machine
21 Stator of 20
22 Rotor of 20
41 First brake
42 Second brake
51 First clutch
52 Second clutch
53 Third clutch
54 Fourth clutch
100 First planetary set
110 Sun of 100
120 Internal gear of 100
130 Carrier of 100
131 Planets on 130
200 Second planetary set (Ravigneaux set)
211 First sun of 200
212 Second sun of 200
220 Internal gear of 200
230 Carrier of 200
231 Long planets on 230
232 Short planets on 230

What is claimed is:

1. A hybrid drive configuration for a motor vehicle, comprising:
a transmission housing;
a first and a second electric machine each having a rotor and each having a stator connected fixedly to said transmission housing, said first and said second electric machine each being operable both in a motor mode and in a generator mode and, via power electronics, being connectable to one another and to an electric energy store;
an input shaft, which is connectable to an internal combustion engine, and an output shaft, which is connectable to an output train;
a first brake and a second brake;
a first clutch and a second clutch;
a first planetary set having a sun, a carrier, and an internal gear, said sun of said first planetary set being connected to said rotor of said second electric machine, said carrier of said first planetary set being connected to said output shaft, and said internal gear of said first planetary set being coupled via said first brake to said transmission housing;
a second planetary set configured as a Ravigneaux set and having a carrier, a first sun, a second sun, long planets, and short planets;
said first sun of said second planetary set meshing with said long planets and being firstly connected to said rotor of said first electric machine and secondly coupled via said first clutch to said internal gear of said first planetary set;
said second sun of said second planetary set meshing with said short planets and being coupled via said second brake to said transmission housing;
said carrier of said second planetary set being coupled via said second clutch to said carrier of said first planetary set; and
said internal gear of said second planetary set being connected to said input shaft.

2. The hybrid drive configuration according to claim 1, including a third clutch, said carrier of said second planetary set being coupled to said internal gear of said second planetary set via said third clutch.

3. The hybrid drive configuration according to claim 1, including a further clutch, said input shaft being coupled via said further clutch to said rotor of said second electric machine.

4. The hybrid drive configuration according to claim 2, including a fourth clutch, said input shaft being coupled via said fourth clutch to said rotor of said second electric machine.

5. The hybrid drive configuration according to claim 1, wherein said input shaft and said output shaft are disposed axially adjacently with respect to one another, and respective connection points of said input shaft and of said output shaft are situated at respective edges on opposite axial sides of the hybrid drive configuration.

6. The hybrid drive configuration according to claim 1, wherein said output shaft is configured as a hollow shaft extending coaxially around said input shaft.

7. The hybrid drive configuration according to claim 6, wherein respective connection points of said input shaft and of said output shaft are situated at an edge on a common axial side of the hybrid drive configuration.

\* \* \* \* \*